(12) United States Patent
Hori et al.

(10) Patent No.: US 12,170,921 B2
(45) Date of Patent: *Dec. 17, 2024

(54) TERMINAL APPARATUS, BASE STATION APPARATUS, AND METHOD

(71) Applicant: Sharp Kabushiki Kaisha, Sakai (JP)

(72) Inventors: Takako Hori, Sakai (JP); Shohei Yamada, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,447

(22) Filed: Dec. 20, 2023

(65) Prior Publication Data
US 2024/0147298 A1 May 2, 2024

Related U.S. Application Data

(63) Continuation of application No. 17/292,944, filed as application No. PCT/JP2019/042255 on Oct. 29, 2019, now Pat. No. 11,902,824.

(30) Foreign Application Priority Data

Oct. 31, 2018 (JP) ................. 2018-205078

(51) Int. Cl.
*H04W 4/00* (2018.01)
*H04W 28/02* (2009.01)
*H04W 76/10* (2018.01)
*H04W 76/20* (2018.01)

(52) U.S. Cl.
CPC ....... *H04W 28/0273* (2013.01); *H04W 76/10* (2018.02); *H04W 76/20* (2018.02)

(58) Field of Classification Search
None
See application file for complete search history.

(56) References Cited

U.S. PATENT DOCUMENTS

| | | | | |
|---|---|---|---|---|
| 10,856,343 | B2* | 12/2020 | Wu ..................... | H04W 76/32 |
| 11,272,391 | B2* | 3/2022 | Zhang ................ | H04W 80/02 |
| 11,310,707 | B2* | 4/2022 | Liu .................... | H04W 28/0263 |
| 11,316,644 | B2* | 4/2022 | Sun .................... | H04L 5/0053 |

(Continued)

OTHER PUBLICATIONS

Hori et al., "Terminal Apparatus, Base Station Apparatus, and Method", U.S. Appl. No. 17/292,944, filed May 11, 2021.

*Primary Examiner* — Sithu Ko
(74) *Attorney, Agent, or Firm* — Keating & Bennett, LLP

(57) ABSTRACT

A terminal apparatus includes: a reception unit configured to receive an RRC reconfiguration message including a DRB configuration and a processing unit, wherein the processing unit establishes an SDAP entity based on conditions that a DRB identity included in the DRB configuration is not part of a configuration of the terminal apparatus, an SDAP configuration is included in the DRB configuration, and an SDAP entity corresponding to a PDU session information element included in the SDAP configuration does not exist, and indicates establishment of a user-plane resource for a PDU session to an upper layer based on an additional condition that the SDAP entity corresponding to the PDU session information element does not exist before the RRC reconfiguration message is received.

2 Claims, 11 Drawing Sheets

(56) References Cited

U.S. PATENT DOCUMENTS

| | | | |
|---|---|---|---|
| 11,452,016 B2 * | 9/2022 | Zhang | H04W 76/10 |
| 11,533,652 B2 * | 12/2022 | Jiang | H04W 28/0268 |
| 11,540,177 B2 * | 12/2022 | Hwang | H04W 48/16 |
| 11,700,543 B2 * | 7/2023 | Li | H04W 28/0263 370/229 |
| 2021/0168882 A1 * | 6/2021 | Chang | H04W 76/11 |
| 2023/0283355 A1 * | 9/2023 | Agiwal | H04W 12/033 370/328 |

* cited by examiner

UP

```
<OMITTED>
RadioBearerConfig ::=            SEQUENCE {
    <PARTLY OMITTED>
    drb-ToAddModList              DRB-ToAddModList        OPTIONAL, -- Need N
    drb-ToReleaseList             DRB-ToReleaseList       OPTIONAL, -- Need N
    <PARTLY OMITTED>

DRB-ToAddModList ::= SEQUENCE (SIZE (1..maxDRB)) OF DRB-ToAddMod
DRB-ToAddMod ::=     SEQUENCE {
    cnAssociation                 CHOICE {
        eps-BearerIdentity            INTEGER (0..15),        -- EPS-DRB-Setup
        sdap-Config                   SDAP-Config             -- 5GC
    }                             OPTIONAL, -- Cond DRBSetup
    drb-Identity                  DRB-Identity,
    <PARTLY OMITTED>
    pdcp-Config                   PDCP-Config             OPTIONAL, -- Cond PDCP
    ...
}
    <PARTLY OMITTED>
DRB-ToReleaseList ::= SEQUENCE (SIZE (1..maxDRB)) OF DRB-Identity
DRB-Identity ::=     INTEGER (1..32)
    <PARTLY OMITTED>
SDAP-Config ::=      SEQUENCE {
    <PARTLY OMITTED>
    pdu-Session                   PDU-SessionID,
    mappedQoS-FlowsToAdd          SEQUENCE (SIZE (1..maxNrofQFIs)) OF QFI
    mappedQoS-FlowsToRelease      SEQUENCE (SIZE (1..maxNrofQFIs)) OF QFI
    ...
}
<OMITTED>
```

FIG. 7

TERMINAL APPARATUS, BASE STATION APPARATUS, AND METHOD

TECHNICAL FIELD

The present invention relates to a terminal apparatus, a base station apparatus, and a method.

This application claims priority based on JP 2018-205078 filed on Oct. 31, 2018, and the contents of which are incorporated herein by reference.

BACKGROUND ART

A radio access method and a radio network for cellular mobile communications (which will hereinafter be referred to as "Long Term Evolution (LTE; trade name)" or "Evolved Universal Terrestrial Radio Access (E-UTRA)") and a core network (which will be referred to as "Evolved Packet Core or EPC") are being studied by the 3rd Generation Partnership Project (3GPP).

As a radio access method and a radio network technology for a 5th generation cellular system, technical studies and standardization of LTE-Advanced Pro which is an enhanced technology of LTE and New Radio technology (NR) which is a new radio access technology are being performed by the 3GPP (NPL 1). Further, 5 Generation Core Network (5GC), which is a core network for the 5th generation cellular system, is also being studied (NPL 2).

CITATION LIST

Non Patent Literature

NPL 1: 3GPP RP-170855, "Work Item on New Radio (NR) Access Technology"
NPL 2: 3GPP TS 23.501 v.15.3.0, "System Architecture for the 5G System; Stage 2"
NPL 3: 3GPP TS 36.300 v.15.3.0, "Evolved Universal Terestrial Radio Access (E-UTRA) and Evolved Universal Terestrial Radio Access Network (E-UTRAN); Overall description; Stage 2"
NPL 4: 3GPP TS 36.331 v.15.3.0, "Evolved Universal Terestrial Radio Access (E-UTRA); Radio Resource Control (RRC); Protocol specifications"
NPL 5: 3GPP TS 36.323 v.15.1.0, "Evolved Universal Terestrial Radio Access (E-UTRA); Packet Data Convergence Protocol (PDCP) specification"
NPL 6: 3GPP TS 36.322 v.15.1.0, "Evolved Universal Terestrial Radio Access (E-UTRA); Radio Link Control (RLC) protocol specification"
NPL 7: 3GPP TS 36.321 v.15.3.0, "Evolved Universal Terestrial Radio Access (E-UTRA); Medium Access Control (MAC) protocol specification"
NPL 8: 3GPP TS 37.340 v.15.3.0, "Evolved Universal Terestrial Radio Access (E-UTRA) and NR; Multi-Connectivity; Stage 2"
NPL 9: 3GPP TS 38.300 v.15.3.1, "NR; NR and NG-RAN Overall description; Stage 2"
NPL 10: 3GPP TS 38.331 v.15.3.0, "NR; Radio Resource Control (RRC); Protocol specifications"
NPL 11: 3GPP TS 38.323 v.15.3.0, "NR; Packet Data Convergence Protocol (PDCP) specification"
NPL 12: 3GPP TS 38.322 v.15.3.0, "NR; Radio Link Control (RLC) protocol specification"
NPL 13: 3GPP TS 38.321 v.15.3.0, "NR; Medium Access Control (MAC) protocol specification"
NPL 14: 3GPP TS 23.401 v14.3.0, "General Packet Radio Service (GPRS) enhancements for Evolved Universal Terrestrial Radio Access Network (E-UTRAN) access"
NPL 15: 3GPP TS 23.502 v.15.3.0, "Procedure for 5G System; Stage 2"
NPL 16: 3GPP TS 37.324 v.15.1.0, "NR; Service Data Adaptation Protocol (SDAP) specification"
NPL 17: 3GPP RP-161266, "5G Architecture Options-Full Set"

SUMMARY OF INVENTION

Technical Problem

As one of technical studies for NR, a protocol for a radio access layer is being studied that performs Quality of Service (QoS) management between a radio access layer of NR and an upper layer that is located at a level equal to or higher than the Internet Protocol (IP) layer.

However, in a case that QoS management between the upper layer and the radio access layer is not performed correctly, there is a problem in that communication between a base station apparatus and a terminal apparatus cannot be efficiently performed.

In view of the circumstances described above, one of objects of an aspect of the present invention is to provide a terminal apparatus capable of efficiently communicating with a base station apparatus, a base station apparatus, a method used for the terminal apparatus, and a method used for the base station apparatus.

Solution to Problem

In order to accomplish the object described above, an aspect of the present invention is contrived to provide the following measures. Specifically, a terminal apparatus for communicating with a base station apparatus includes: a reception unit configured to receive a Radio Resource Control (RRC) reconfiguration message including a DRB configuration from the base station apparatus; and a processing unit, wherein the processing unit establishes a Service Data Adaptation Protocol (SDAP) entity based on conditions that a DRB identity included in the DRB configuration is not part of a configuration of the terminal apparatus, an SDAP configuration is included in the DRB configuration, and an SDAP entity corresponding to a Protocol Data Unit (PDU) session information element included in the SDAP configuration does not exist, and indicates establishment of a user-plane resource for a PDU session to an upper layer based on conditions that a DRB identity included in the DRB configuration is not part of a configuration of the terminal apparatus, an SDAP configuration is included in the DRB configuration, an SDAP entity corresponding to a PDU session information element included in the SDAP configuration does not exist, and the SDAP entity corresponding to the PDU session information element does not exist before the RRC reconfiguration message is received.

Further, according to an aspect of the present invention, a base station apparatus for communicating with a terminal apparatus includes: a transmitter configured to transmit a Radio Resource Control (RRC) reconfiguration message including a DRB configuration to the terminal apparatus; and a processing unit configured to cause the terminal apparatus to perform processing by including the DRB configuration in the RRC reconfiguration message. The processing includes establishing a Service Data Adaptation Protocol entity based on conditions that a DRB identity included in the DRB configuration is not part of a configuration of the terminal apparatus, an SDAP configuration is included in the DRB configuration, and an SDAP entity corresponding to a Protocol Data Unit (PDU) session information element included in the SDAP configuration does not exist, and indicating establishment of a user-plane resource for a PDU session to an upper layer based on conditions that a DRB identity included in the DRB configuration is not part of a configuration of the terminal apparatus, an SDAP configuration is included in the DRB configuration, an SDAP entity corresponding to a PDU session information element included in the SDAP configuration does not exist, and the SDAP entity corresponding to the PDU session information element does not exist prior to that the terminal apparatus receives the RRC reconfiguration message.

According to an aspect of the present invention, a communication method used by a terminal apparatus for communicating with a base station apparatus, the communication method comprising the steps of: receiving a Radio Resource Control (RRC) reconfiguration message including a DRB configuration from the base station apparatus; establishing a Service Data Adaptation Protocol entity based on conditions that a DRB identity included in the DRB configuration is not part of a configuration of the terminal apparatus, an SDAP configuration is included in the DRB configuration, and an SDAP entity corresponding to a Protocol Data Unit (PDU) session information element included in the SDAP configuration does not exist; and indicating establishment of a user-plane resource for the PDU session information element to an upper layer based on conditions that a DRB identity included in the DRB configuration is not part of a configuration of the terminal apparatus, an SDAP configuration is included in the DRB configuration, an SDAP entity corresponding to a PDU session information element included in the SDAP configuration does not exist, and the SDAP entity corresponding to the PDU session does not exist prior to receiving the RRC reconfiguration message.

According to an aspect of the present invention, a communication method used by a base station apparatus for communicating with a terminal apparatus, the communication method comprising the steps of: transmitting a Radio Resource Control (RRC) reconfiguration message including a DRB configuration to the terminal apparatus; and causing the terminal apparatus to perform processing by including the DRB configuration in the RRC reconfiguration message. The processing includes establishing a Service Data Adaptation Protocol (SDAP) entity based on conditions that a DRB identity included in the DRB configuration is not part of a configuration of the terminal apparatus, an SDAP configuration is included in the DRB configuration, and an SDAP entity corresponding to a Protocol Data Unit (PDU) session information element included in the SDAP configuration does not exist, and indicating establishment of a upper-layer resource for the PDU session information element to an upper layer based on conditions that a DRB identity included in the DRB configuration is not part of a configuration of the terminal apparatus, an SDAP configuration is included in the DRB configuration, an SDAP entity corresponding to a PDU session information element included in the SDAP configuration does not exist, and the SDAP entity corresponding to the PDU session information element does not exist prior to that the terminal apparatus receives the RRC reconfiguration message.

Note that these comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to one aspect of the present invention, a terminal apparatus can efficiently perform communication by reducing complexity of protocol processing.

BRIEF DESCRIPTION OF DRAWINGS

FIG. 7 is an example of information relating to a radio bearer configuration and an Abstract Syntax Notation One (ASN.1) description of information according to each embodiment of the present invention.

DESCRIPTION OF EMBODIMENTS

Hereinafter, embodiments of the present invention will be described in detail with reference to the drawings.

LTE (and LTE-A Pro) and NR may be defined as different RATs. The NR may be defined as a technology included in the LTE. The LTE may be defined as a technology included in the NR. The LTE that is connectable to the NR using Multi RAT Dual connectivity (MR-DC) described in NPL 7 may be distinguished from the existing LTE. The present embodiment may be applied to the NR, the LTE and other RATs. Terms associated with the LTE and the NR are used in the following description. However, the present invention may be applied to other technologies using other terms. In the present embodiment, the term "E-UTRA" may be replaced with "LTE," and the term "LTE" may be replaced with "E-UTRA".

Figure 1:
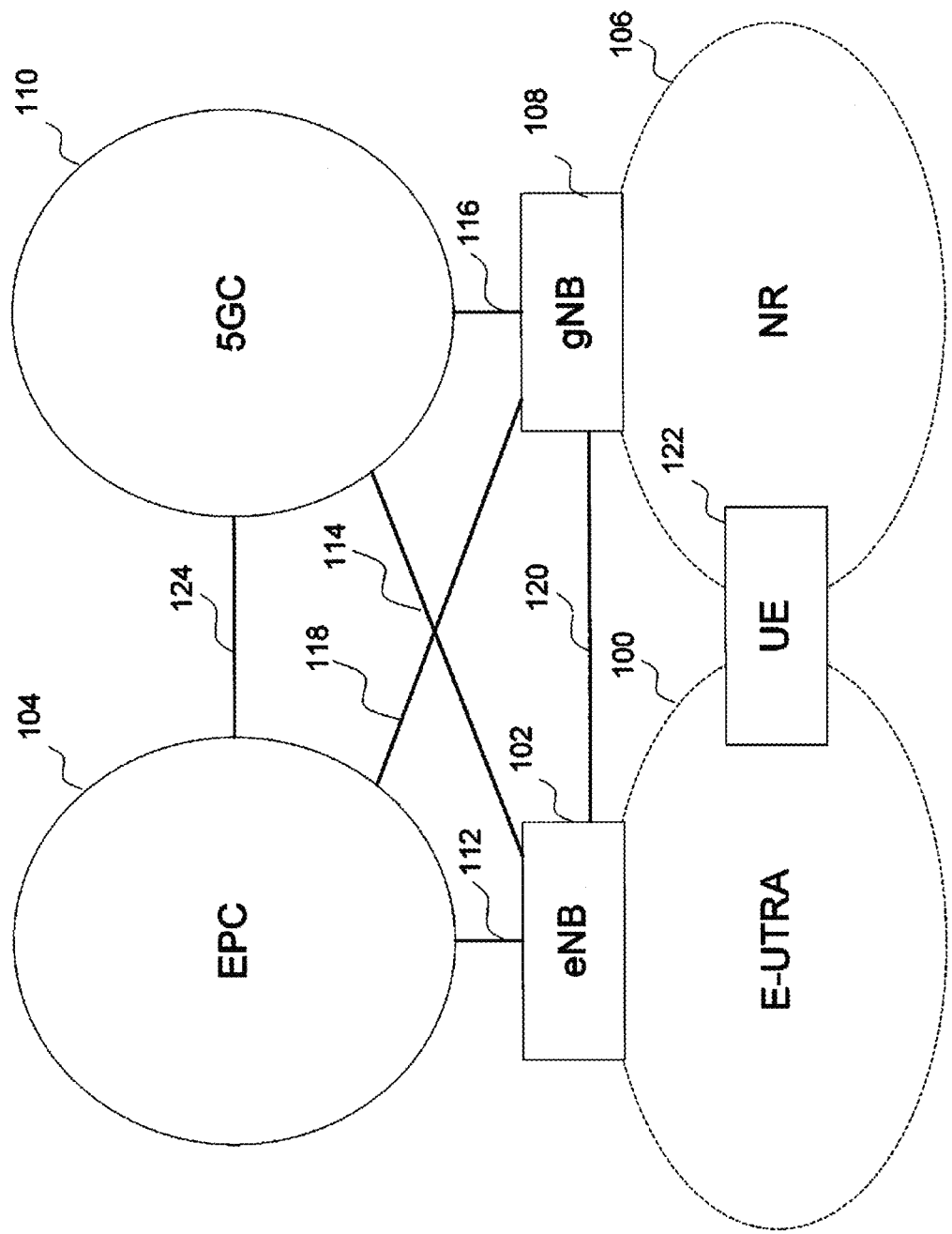
FIG. 1 is a schematic diagram of a communication system according to each embodiment of the present invention.

FIG. 1 is a schematic diagram of a communication system according to each embodiment of the present invention.

An E-UTRA 100 is a radio access technology described in NPL 3 or the like, and includes a Cell Group (CG) configured in one or multiple frequency bands. An E-UTRAN Node B (eNB) 102 is a base station apparatus of the E-UTRA. An Evolved Packet Core (EPC) 104 is a core network described in NPL 14 or the like and is designed as a core network for the E-UTRA. An interface 112 is an interface between the eNB 102 and the EPC 104, where there is a control plane (CP) through which control signals are transferred and a user plane (UP) through which user data is transferred.

An NR 106 is a radio access technology described in NPL 9 or the like, and includes a Cell Group (CG) configured in one or multiple frequency bands. A gNode B (gNB) 108 is an NR base station apparatus. A 5GC 110 is a core network described in NPL 2 or the like, and is designed as a core network for NR, but may also be used as a core network of E-UTRA having a function of connecting to the 5CG. Hereinafter, the E-UTRA may include E-UTRA having a function of connecting to the 5CG.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, and the interface 124 are interfaces that transfer CP only, UP only, or both the CP and the UP. The interface 114, the interface 116, the interface 118, the interface 120, and the interface 124 may not exist depending on communication systems provided by network operators.

A UE 122 is a terminal apparatus supporting the NR or both the E-UTRA and the NR.

FIG. 2 is a diagram of Protocol Stacks of UP and CP of the terminal apparatus and the base station apparatus in an E-UTRA radio access layer according to each embodiment of the present invention.

Figure 2A:
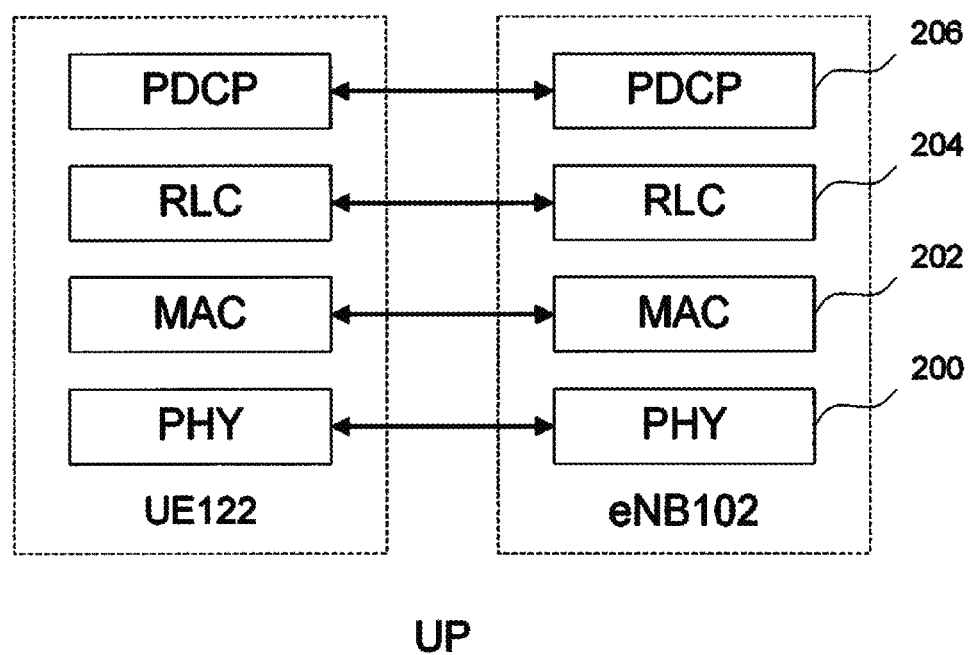
FIG. 2A is a diagram of a protocol stack of a UP of a terminal apparatus and a base station apparatus in E-UTRA according to each embodiment of the present invention.

FIG. 2A is a diagram of the protocol stack of the UP used in a case that the UE 122 communicates with the eNB 102 in the E-UTRA 100.

A Physical layer (PHY) 200 is a radio physical layer for providing a transmission service to an upper layer by using a Physical Channel. The PHY 200 is connected with a Medium Access Control layer (MAC) 202, which is an upper layer to be described below, via transport channels. Data is exchanged between the MAC 202 and the PHY 200 via the transport channels. The data is transmitted and/or received via radio physical channels between the PHYs of the UE 122 and the eNB 102.

The MAC 202 is a medium access control layer for mapping various Logical Channels to various transport channels. The MAC 202 is connected with a Radio Link Control layer (RLC) 204, which is an upper layer to be described below, via logical channels. The major classifications of the logical channel depend on the type of information to be transmitted, specifically, the logical channels are classified into control channels for transmitting control information and traffic channels for transmitting user information. The MAC 202 has a function of controlling the PHY 200 in order to perform the Discontinuous Reception and Transmission (DRX and DTX), a function of performing a Random Access procedure, a function of reporting transmit power information, a function of performing HARQ control, and the like (NPL 7).

The RLC 204 is a radio link control layer for dividing (Segmentation) the data received from a Packet Data Convergence Protocol Layer (PDCP) 206, which is an upper layer to be described below, and adjusting the data size such that a lower layer can properly perform data transmission. The RLC 200 also has a function of ensuring Quality of Service (QoS) required for each piece of data. In other words, the RLC 204 has a function of data re-transmission control or the like (NPL 6).

A PDCP 206 is a packet data convergence protocol layer for efficiently transmitting IP Packets, which are user data, in a radio segment. The PDCP 206 may have a header compression function of compressing unnecessary control information. The PDCP 206 may also have a data encryption function (NPL 5).

Note that data processed in the MAC 202, the RLC 204, and the PDCP 206 are referred to as a MAC Protocol Data Unit (PDU), an RLC PDU, and a PDCP PDU, respectively. Data delivered from an upper layer to the MAC 202, the RLC 204, and the PDCP 206 or data delivered therefrom to an upper layer are respectively referred to as a MAC Service Data Unit (SDU), an RLC SDU, and a PDCP SDU.

Figure 2B:
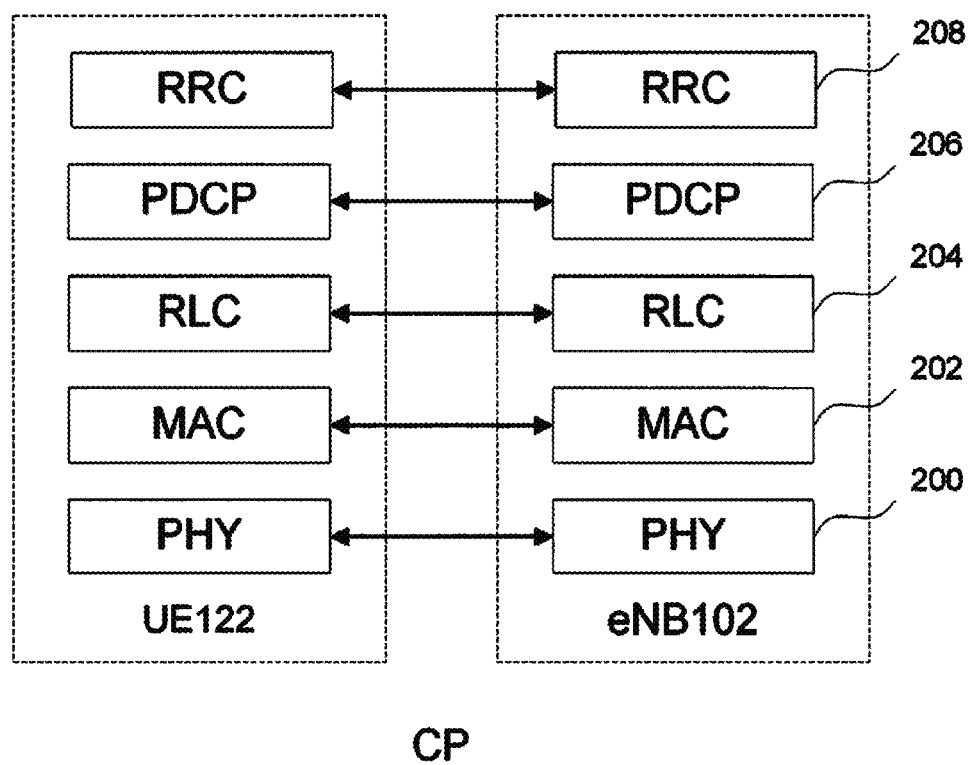
FIG. 2B is a diagram of a protocol stack of a CP.

FIG. 2B is a diagram of the protocol stack of the CP used in a case that the UE 122 communicates with the eNB 102 in the E-UTRA 100.

In addition to the PHY 200, the MAC 202, the RLC 204, and the PDCP 206, there is a Radio Resource Control layer (RRC) 208 in the protocol stack of the CP. The RRC 208 is a radio link control layer for controlling logical channels, transport channels, and physical channels by configuring and reconfiguring Radio Bearers (RBs) and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured in the RRCs 208 of the eNB 102 and the UE 122 (NPL 4).

The functional classification of the MAC 202, the RLC 204, the PDCP 206, and the RRC 208 described above is an example, and some or all of the respective functions may not be implemented. Some or all of the functions of each layer may be included in another layer.

Note that, an IP layer and a Transmission Control Protocol (TCP) layer, a User Datagram Protocol (UDP) layer, an application layer, and the like that are upper layers than the IP layer are upper layers than the PDCP layer (not illustrated). The RRC layer or Non Access Strarum (NAS) layer also serves as an upper layer of the SDAP layer (not illustrated). In other words, the PDCP layer is a lower layer than the RRC layer, the NAS layer, the IP layer, and the Transmission Control Protocol (TCP) layer, the User Datagram Protocol (UDP) layer, and the application layer.

FIG. 3 is a diagram of Protocol Stacks of UP and CP of a terminal apparatus and a base station apparatus in an NR radio access layer according to each embodiment of the present invention.

Figure 3A:
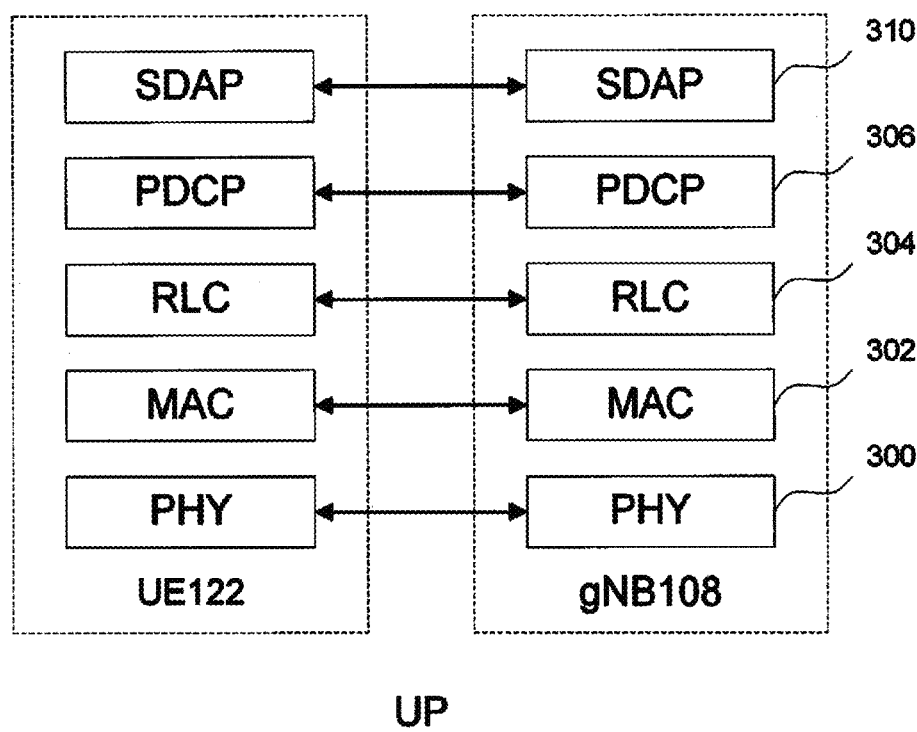
FIG. 3A is a diagram of a protocol stack of the UP of a terminal apparatus and a base station apparatus in NR according to each embodiment of the present invention.

FIG. 3A is a diagram of the protocol stack of the UP used in a case that the UE 122 communicates with the gNB 108 in the NR 106.

A Physical layer (PHY) 300 is a radio physical layer of the NR and may provide a transmission service to upper layers by using the Physical Channel. The PHY 300 may be connected with the Medium Access Control layer (MAC) 302, which is an upper layer to be described below, via the transport channels. Data may be exchanged between the MAC 302 and the PHY 300 via the transport channels. The data may be transmitted and/or received between the PHYs of the UE 122 and the gNB 108 via the radio physical channels.

The MAC 302 is a medium access control layer for mapping various Logical Channels to various transport channels. The MAC 302 may be connected with a Radio Link Control layer (RLC) 304, which is an upper layer to be described below, via the logical channels. The classification of the logical channel depends on the type of information to be transmitted, and the logical channels may be classified into the control channels for transmitting the control information and the traffic channels for transmitting the user information. The MAC 302 may have a function of controlling the PHY 300 in order to perform the Discontinuous Reception and Transmission (DRX and DTX), a function of performing the Random Access procedure, a function of indicating the transmit power information, a function of performing the HARQ control, and the like (NPL 13).

An RLC 304 is a radio link control layer for dividing (Segmentation) the data received from a Packet Data Convergence Protocol Layer (PDCP) 206, which is an upper layer to be described below, and adjusting a data size such that a lower layer can properly perform data transmission. The RLC 304 may also have a function of ensuring Quality of Service (QoS) required for each piece of data. In other words, the RLC 304 may have a function of data re-transmission control or the like (NPL 12).

A PDCP 306 is a packet data convergence protocol layer for efficiently transmitting IP Packets, which are user data, in a radio segment. The PDCP 306 may have a header compression function of compressing unnecessary control information. The PDCP 306 may also have a data encryption function (NPL 11).

A Service Data Adaptation Protocol (SDAP) 310 may be a service data adaptation protocol layer having a function of mapping a DRB and a QoS flow of a downlink transmitted from a core network to a terminal apparatus through a base station apparatus, mapping the DRB and a QoS flow of an uplink transmitted from the terminal apparatus to the core network through the base station apparatus, and storing mapping rule information (NPL 16). In a case that a terminal apparatus receives an SDAP SDU with QoS flow information from an upper layer, the terminal apparatus assigns the SDAP SDU to the corresponding DRB based on a mapping rule between the stored QoS flow and the DRB. In a case that a mapping rule between the QoS flow and the DRB is not stored, the SDAP SDU may be assigned to a default radio bearer (default DRB). The QoS flow includes one or multiple Service Data Flows (SDFs) processed using the same QoS policy (NPL 2). The SDAP may have a Reflective QoS function of mapping the QoS flow of the uplink and the DRB, based on information of the QoS flow of the downlink. In a case that a mapping rule between the QoS flow and the DRB changes, an End Marker DPU may be generated and transmitted to the DRB before the change to ensure in-sequence delivery of the SDAP SDU (NPL 2 and NPL 16).

The end marker PDU is an SDAP control PDU described in NPL 16, and is used in a case that an SDAP entity of a UE reports the end of mapping between a QoS flow corresponding to a QoS flow identity included in a QoS flow identity field of the end marker PDU and a radio bearer to which the end marker PDU is transmitted.

Note that, an IP layer and a Transmission Control Protocol (TCP) layer, a User Datagram Protocol (UDP) layer, an application layer, and the like that are upper layers than the IP layer are upper layers than an SDAP layer (not illustrated). The RRC layer or Non Access Strarum (NAS) layer also serves as an upper layer of the SDAP layer (not illustrated). In the NAS layer, a mapping between the service data flow and the QoS flow is performed. In other words, the SDAP layer is a lower layer than the RRC layer, the NAS layer, the IP layer, and the Transmission Control Protocol (TCP) layer, the User Datagram Protocol (UDP) layer, and the application layer that are upper layers than the IP layer.

Note that the data processed in the MAC 302, the RLC 304, the PDCP 306, and the SDAP 310 may be referred to as a MAC Protocol Data Unit (PDU), an RLC PDU, a PDCP PDU, and an SDAP PDU, respectively. The data delivered from upper layers to the MAC 202, the RLC 204, and the PDCP 206 or data delivered to upper layers therefrom may be respectively referred to as a MAC Service Data Unit (SDU), an RLC SDU, a PDCP SDU, and an SDAP SDU.

Figure 3B:
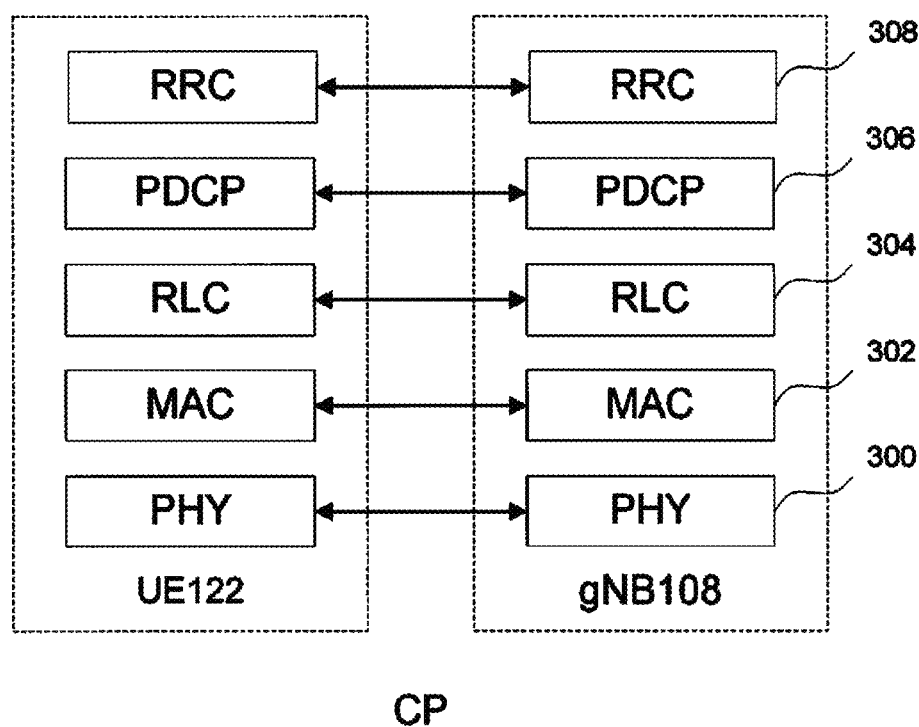
FIG. 3B is a diagram of a protocol stack of the CP of the terminal apparatus and the base station apparatus in NR according to each embodiment of the present invention.

FIG. 3B is a diagram of the protocol stack of the CP used in a case that the UE 122 communicates with the gNB 108 in the NR 106.

In addition to the PHY 300, the MAC 302, the RLC 304, and the PDCP 306, there is a Radio Resource Control layer (RRC) 308 in the protocol stack of the CP. The RRC 308 is a radio link control layer for controlling logical channels, transport channels, and physical channels by configuring and reconfiguring Radio Bearers (RBs) and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between RRCs 308 of the gNB 108 and the UE 122. A portion including the RLC 304 and the MAC 302 in the RBs may be referred to as an RLC bearer (NPL 10).

The functional classification of the MAC 302, the RLC 304, the PDCP 306, the SDAP 310, and the RRC 308 described above is an example, and some or all of the functions may not be implemented. Some or all of the functions of each layer may be included in another layer.

Note that, hereinafter, in each embodiment of the present invention, in order to distinguish an E-UTRA protocol and an NR protocol from each other, the MAC 202, the RLC 204, the PDCP 206, and the RRC 208 may be respectively referred to as a MAC for E-UTRA or a MAC for LTE, an RLC for E-UTRA or an RLC for LTE, a PDCP for E-UTRA or a PDCP for LTE, and an RRC for E-UTRA or an RRC for LTE. The MAC 302, the RLC 304, the PDCP 306, and the RRC 308 may also be referred to as MAC for NR, RLC for NR, RLC for NR, and RRC for NR, respectively. Alternatively, there may be descriptions using a space such as an E-UTRA PDCP or an LTE PDCP, an NR PDCP, and the like.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. The PDCP 206 in FIG. 2 may also be replaced with the PDCP 306 in FIG. 3. The RRC 308 in FIG. 3 may include the function of the RRC 208 in FIG. 2. The PDCP 306 in FIG. 3 may be the PDCP 206 in FIG. 2. In the E-UTRA 100, an NR PDCP may be used as a PDCP even in a case that the UE 122 communicates with the eNB 102.

EMBODIMENTS

Embodiments of the present invention will be described with reference to FIG. 1 to FIG. 9. In the embodiments of the present invention, in a case that the SDAP entity is established, a condition that the user-plane resources for the PDU session have been established or configured is indicated to the upper layer in a case that the PDU session is newly established.

Figure 4:
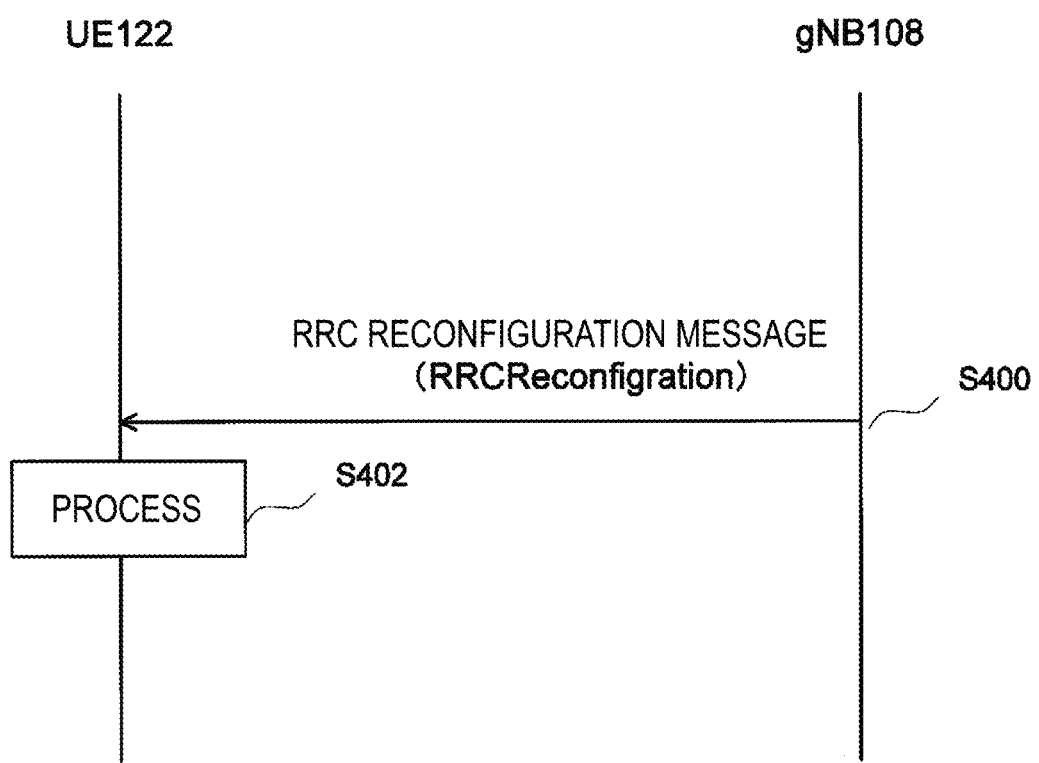
FIG. 4 is a diagram illustrating an example of a flow of an RRC reconfiguration procedure according to each embodiment of the present invention.

FIG. 4 is a diagram illustrating an example of a flow of an RRC reconfiguration procedure according to each embodiment of the present invention. Note that the RRC reconfiguration procedure may be an RRC connection reconfiguration procedure.

The RRC connection reconfiguration procedure (RRC Connection Reconfiguration) is a procedure used for configuration of handover, Measurement, and the like in addition to configuration of establishment, change, and release of a Radio Bearer (RB), a change, a release, and the like of a secondary cell in LTE described in NPL 4. Meanwhile, the RRC reconfiguration procedure (RRC Reconfiguration) is a procedure used for configuration of handover (reconfiguration involving synchronization), Measurement, and the like in addition to configuration of establishment, change, and release of an RB, a change, a release, and the like of a secondary cell in NR described in NPL 10. Note that information included in each message in the RRC connection reconfiguration procedure in order to perform configuration of establishment, change, release of the RB described above, change, release, handover, measurement, and the like of secondary cells is referred to as configuration information in the embodiments of the present invention. Note that the configuration information is not limited to the configuration described above, and may be another configuration, or may be included in each message in another procedure, not limited to the RRC connection reconfiguration procedure.

The RRC connection reconfiguration procedure may be used for E-UTRA-NR Dual Connectivity (EN-DC) (option 3 and optional 3a described in NPL 17) which is MR-DC particularly in the case that the core network is the EPC 104 and a master node is the eNB 102 (also referred to as an extended eNB 102) in Multi-RAT Dual Connectivity (MR-DC) described in NPL 8, NG-RAN E-UTRA-NR Dual Connectivity (NGEN-DC) (option 7 and optional 7a described in NPL 17) which is MR-DC in the case that the core network is the 5GC 110 and the master node is the eNB 102, and E-UTRA/5GC (option 5 described in NPL 17) in which the eNB 102 (extended eNB) uses 5GC as the core network. In this case, the RRC connection reconfiguration procedure may include configuration information of NR described in NPL 10 as well as configuration information of LTE (E-UTRA). In this case, the RRC connection reconfiguration message may be transmitted from the eNB 102 to the UE 122 via the gNB 108.

The RRC reconfiguration procedure may be used for NR-E-UTRA Dual Connectivity (NE-DC) (option 4 and option 4a described in NPL 17), which is MR-DC particularly in a case that the core network is the 5GC 110 and the master node is the gNB 108 in MR-DC. In this case, the RRC reconfiguration procedure may include configuration information for NR, as well as configuration information for LTE (E-UTRA) described in NPL 10. In this case, the RRC reconfiguration message may be transmitted from the gNB 108 to the UE 122 via the eNB 102.

In each embodiment of the present invention, in order to avoid complexity of description, description is made by using the name of the RRC reconfiguration procedure, and using the gNB 108 as the base station apparatus. Note that the names for architecture such of EN-DC, NGEN-DC, E-UTRA/5GC, NE-DC, and the like may be referred to as other names as well.

In the RRC reconfiguration procedure, the UE 122 receives an RRC reconfiguration message (RRCReconfiguration) from the gNB 108 (step S400) and performs processing of various configurations, for example, configuration of the radio bearer, configuration of the SDAP and the like based on information included in the RRC reconfiguration message (Step S402). After Step S402, the UE 122 may transmit an RRC reconfiguration complete message (RRCReconfigurationComplete) to the gNB 108 (not illustrated). Note that the RRC reconfiguration message may be referred to as an RRC reconfiguration, and the RRC reconfiguration complete message may be referred to as an RRC reconfiguration complete.

Figure 5:
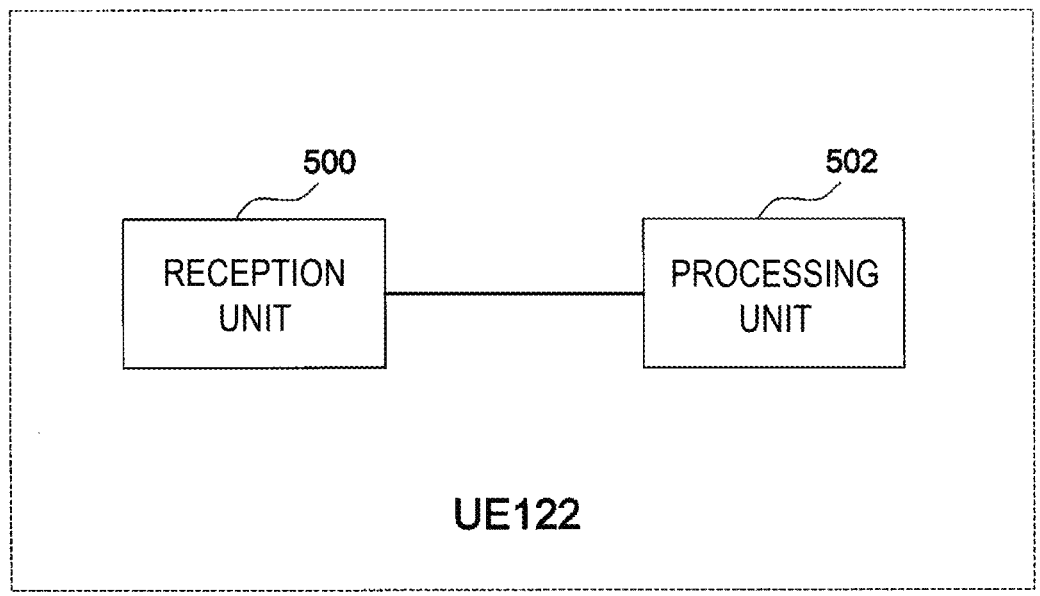
FIG. 5 is a block diagram illustrating a configuration of the terminal apparatus according to each embodiment of the present invention.

FIG. 5 is a block diagram illustrating a configuration of the terminal apparatus (UE 122) according to each embodiment of the present invention. Note that FIG. 5 illustrates only the main components closely related to the present invention in order to avoid complexity of description.

The UE 122 illustrated in FIG. 5 includes a reception unit 500 configured to receive an RRC reconfiguration message or the like from gNB 108, and a processing unit 502 configured to perform processing in accordance with configuration information, such as various Information Elements (IEs) included in the received message, and/or various fields and/or various conditions.

Figure 6:
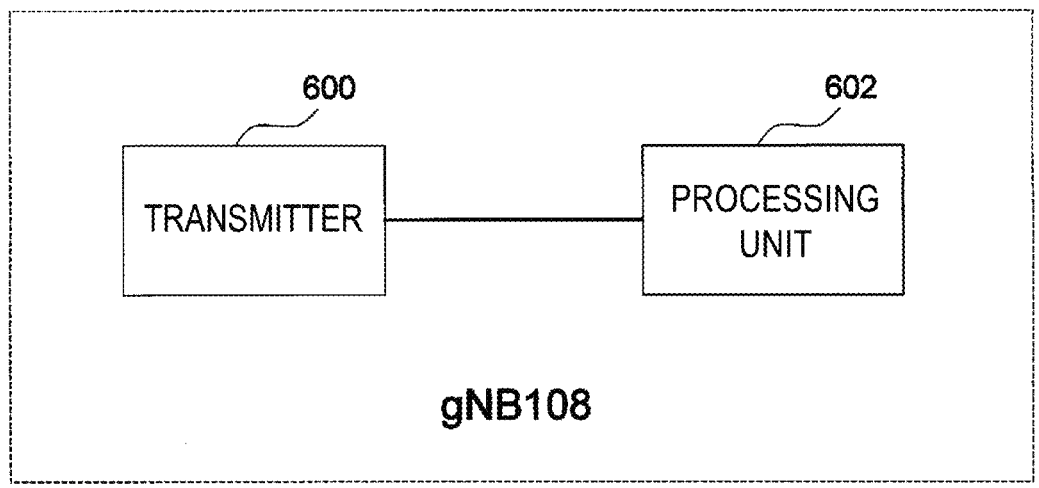
FIG. 6 is a block diagram illustrating a configuration of the base station apparatus according to each embodiment of the present invention.

FIG. 6 is a block diagram illustrating a configuration of the base station apparatus (gNB 108) according to each embodiment of the present invention. Note that FIG. 6 illustrates only the main components closely related to the present invention in order to avoid complexity of description.

The gNB 108 illustrated in FIG. 6 includes a transmitter 600 configured to transmit an RRC reconfiguration message or the like to UE 122, and a processing unit 602 configured to cause the processing unit 502 of the UE 122 to perform processing by generating an RRC reconfiguration message including configuration information, such as various Information Elements (IEs), and/or various fields, and/or various conditions, and transmitting the message to the UE 122. Note that the configuration illustrated in FIG. 6 may be adapted to the eNB 102. In a case that the configuration is adapted to the eNB 102, the message transmitted to the UE 122 from the transmitter 600 may be an RRC connection reconfiguration message.

FIG. 7 is, in the first embodiment of the present invention, an example of Abstract Syntax Notation One (ASN.1) description indicating the information elements included in the RRC reconfiguration message in FIG. 4. In the 3GPP, in the specifications relating to the RRC (NPL 4 and NPL 10), a message, Information Element (IE), and the like relating to the RRC are described using ASN.1. In the example of ASN.1 illustrated in FIG. 7, <omitted> and <partly omitted> are not part of the notation of ASN.1 and mean that other information is omitted. Note that there may also be omitted information elements in a part where neither <omitted> nor <partly omitted> is indicated. Note that the example of ASN.1 illustrated in FIG. 7 does not correctly follow the ASN.1 notation method but is an example notation of parameters for the RRC reconfiguration according to the present invention, and other designations and other notations may be used. In order to avoid complexity of description, the example of ASN.1 illustrated in FIG. 7 represents only an example relating to main information that is closely related to the present invention.

The information element represented in DRB-ToAddModList or DRBToAddMod in FIG. 7 may be a list of information indicating a configuration of the DRB (data radio bearers) to be added or changed, and in the embodiments of the present invention, the information element may also be referred to as a DRB configuration or a data radio bearer information element.

The information element represented by DRB-Identity in the DRB configuration is information of the DRB identity of the DRB to be added or changed, and in the embodiments of the present invention, the information element may also be referred to as a DRB identity information element or a data radio bearer identity information element. In the example illustrated in FIG. 7, DRB-Identity is configured to be an integer value in the range of 1 to 32, but other values may be configured. For DC, the DRB identity is unique within the scope of the UE 122.

The information element represented by cnAssociation in the DRB configuration may be an information element indicating whether the EPC 104 is used or the 5GC 110 is used for the core network, and in the embodiments of the present invention, the information element may also be referred to as a core network association information element. In other words, in a case that the UE 122 connects to the EPC, the DRB may be associated with the EPS bearer identity information element (eps-BearerIdentity) in cnAssociation, or the EPS bearer identity which is a value of the EPS bearer identity information element, and in a case that the UE 122 connects to the 5GC 110, the DRB may be associated with an SDAP entity configured in accordance with an SDAP configuration (sdap-Config) described below, or a PDU session information element included in the SDAP configuration, or a PDU session identity, which is a value of the PDU session information element, or a PDU session indicated by the PDU session information element. In other words, the information represented by cnAssociation may include the EPS bearer identity information element (eps-BearerIdentity) in a case of using the EPC 104 for the core network, such as a case of using EN-DC, or may include an information element (sdap-Config) indicating the SDAP configuration in a case of using the core network 5GC 110, in other words, in a case that EN-DC is not used.

The information element represented by sdap-Config may be information related to a configuration or reconfiguration of the SDAP entity that determines the mapping method of the QoS flow and the DRB in a case that the core network is the 5GC 110, and in the embodiments of the present invention, the information element may also be referred to as an SDAP configuration.

The field or information element indicated by pdu-session or PDU-SessionID included in the SDAP configuration may be an identity of a PDU session described in NPL 2 to which a QoS flow belongs, the QoS flow being mapped to a radio bearer corresponding to a value of the DRB identity information element included in the DRB configuration including the SDAP configuration, and in the embodiments of the present invention, the field or information element may also be referred to as a PDU session information element. The value of the PDU session information element may be an integer that is not negative.

The information element indicated by mappedQoS-FlowsToAdd included in the SDAP configuration may be information indicating a list of QoS Flow Identity (QFI) information elements described below of a QoS flow to be mapped or additionally mapped to a radio bearer corresponding to a value of the DRB identity information element included in the DRB configuration including the SDAP configuration, and in the embodiments of the present invention, the information element may also be referred to as a QoS flow information element to be added. The QoS flow described above may be a QoS flow of a PDU session indicated by the PDU session information element included in the SDAP configuration.

The information element indicated by mappedQoS-FlowsToRelease included in the SDAP configuration may be information indicating a list of QoS Flow Identity (QFI) information elements described below of a QoS flow that releases the corresponding relationship among QoS flows mapped to a radio bearer corresponding to a value of the DRB identity information element included in the DRB configuration including the SDAP configuration, and in the embodiments of the present invention, the information element may also be referred to as a QoS flow information element to be released. The QoS flow described above may be a QoS flow of a PDU session indicated by the PDU session information element included in the SDAP configuration.

The information element indicated by QFI may be a QoS flow identity that uniquely identifies a QoS flow described in NPL 2, and in the embodiments of the present invention, the information element may also be referred to as a QoS flow identity information element. The value of the QoS flow identity information element may be an integer that is not negative. The value of the QoS flow identity information element may be unique to a PDU session.

The SDAP configuration may include, in addition, an uplink header information element indicating whether or not an uplink SDAP header is present in uplink data to be transmitted via the configured DRB, a downlink header information element indicating whether or not a downlink SDAP header is present in downlink data received via the configured DRB, a default bearer information element indicating whether or not the configured DRB is a default radio bearer (default DRB), and the like.

The information element represented by pdcp-Config or PDCP-Config in the DRB configuration may be information related to a configuration of an NR PDCP entity for establishing or changing the PDCP 306 for SRB or DRB, and in the embodiments of the present invention, the information element may also be referred to as a PDCP configuration. The information related to the configuration of the NR PDCP entity may include information indicating the size of the uplink sequence number, information indicating the size of the downlink sequence number, information indicating the profile of header compression (RObust Header Compression (RoHC)), re-ordering timer information, and the like.

The information element represented by DRB-ToReleaseList in the DRB configuration may list information of the DRB identities of the DRBs to be released, and in the embodiments of the present invention, the information element may also be referred to as a radio bearer information element to be released or a data radio bearer information element to be released.

Some or all of the information elements illustrated in FIG. 7 may be optional. In other words, the information elements illustrated in FIG. 7 may be included in an RRC reconfiguration message depending on the necessity and conditions.

Figure 8:
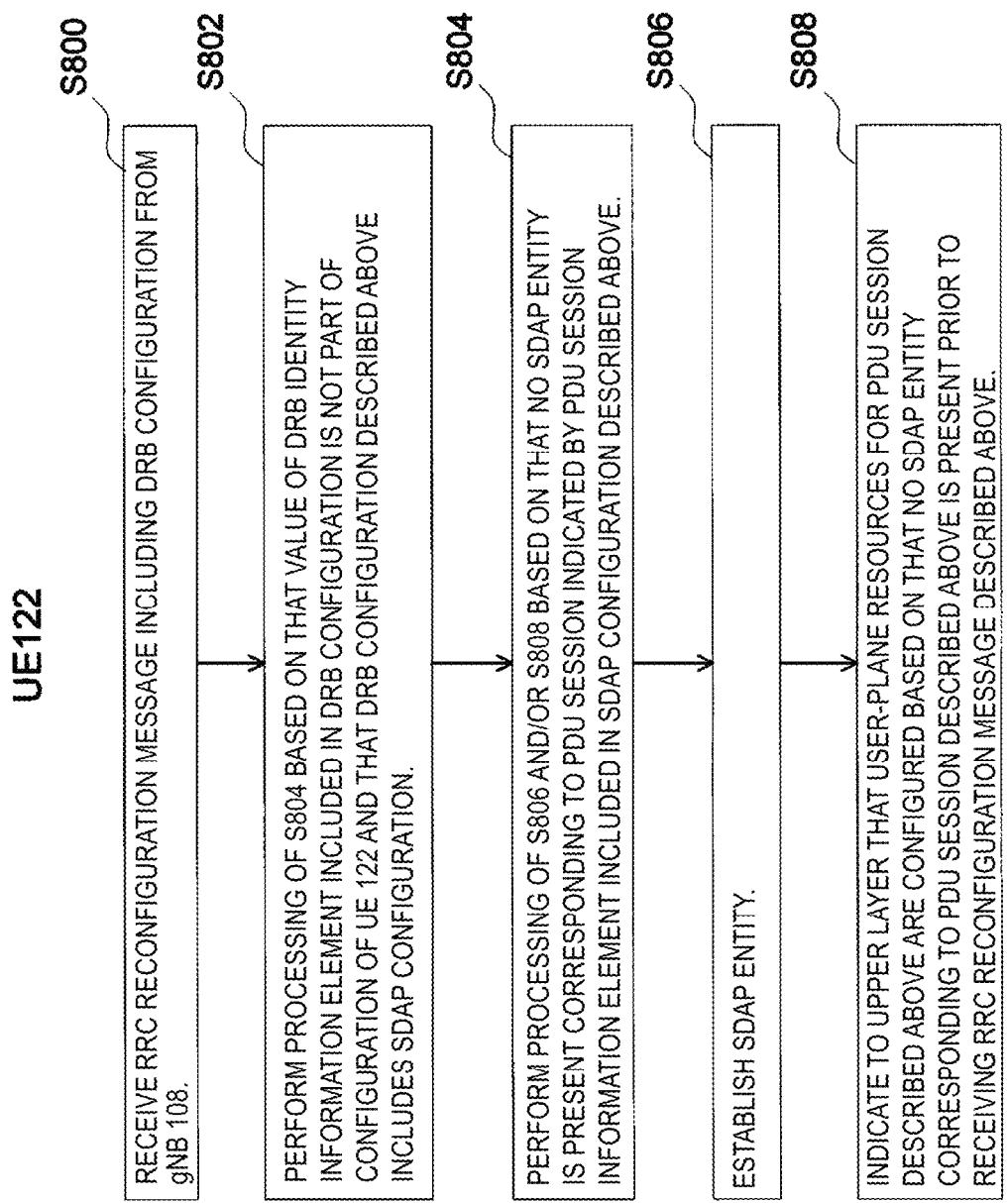
FIG. 8 is a diagram illustrating an example of a processing method according to an embodiment of the present invention.

An example of a processing method of the UE 122 according to the embodiments of the present invention will be described with reference to FIG. 8.

The processing unit 602 of the gNB 108 generates an RRC reconfiguration message including the DRB configuration for causing the UE 122 to perform processing, and transmits the RRC reconfiguration message from the transmitter 600 to the UE 122 (not illustrated). The reception unit 500 of the UE 122 receives the RRC reconfiguration message from the gNB 108 (step S800). Note that the UE 122 may receive the RRC message including the DRB configuration described above from the eNB 102.

Next, the processing unit 502 of the UE 122 determines whether or not the value of the DRB identity information element included in the DRB configuration described above is configured to the UE 122 and whether or not the DRB configuration described above includes an SDAP configuration, and based on that the value of the DRB identity information element included in the DRB configuration described above is not part of a configuration of the UE 122 and/or the DRB configuration described above includes an SDAP configuration, performs processing of step S804 described below (step S802).

The processing unit 502 of the UE 122 determines whether or not an SDAP entity corresponding to a PDU session indicated by a PDU session information element included in the SDAP configuration described above is present, and based on that no SDAP entity is present corresponding to the PDU session indicated by the PDU session information element included in the SDAP configuration described above, performs processing of step S806 and/or step S808 (step S804).

The processing unit 502 of the UE 122 establishes an SDAP entity (step S806). Note that, prior to establishing the SDAP entity described above, a DRB corresponding to the value of the DRB identity information element described above may be established by establishing a PDCP entity or the like. Note that after establishing the SDAP entity described above, the SDAP entity may be further configured or reconfigured. In a case that the SDAP entity is configured or reconfigured, the established DRB described above may be related to the SDAP entity described above.

The processing unit 502 of the UE 122 determines whether or not an SDAP entity corresponding to the PDU session described above has been present prior to receiving the RRC reconfiguration message described above, and based on that no SDAP entity corresponding to the PDU session described above has been present prior to receiving the RRC reconfiguration message described above, indicates to the upper layer that "user-plane resources for the PDU session described above are established" (step S808). Note that "the user-plane resources for the PDU session described above are established" may be rephrased in other representations such as "user-plane resources for the PDU session described above is configured".

"The user-plane resources for the PDU session described above are established" may be rephrased as "the QoS flow identity information element included in the QoS flow information element to be added included in the SDAP configuration described above, or a mapping rule between the QoS flow corresponding to the value of the QoS flow identity information element and the radio bearer is stored".

Indicating that "the user-plane resources for the PDU session described above are established" may be indicating to the upper layer the PDU session identity information element described above or the value of the PDU session identity information element, for example. At this time, the QoS flow identity information element described above or the value of the QoS flow identity information element may be simultaneously indicated to the upper layer, or instead of indicating to the upper layer the PDU session identity information element described above or the value of the PDU session identity information element described above, the QoS flow identity information element described above or the value of the QoS identity information element described above may be indicated to the upper layer.

"Determining whether or not an SDAP entity corresponding to the PDU session described above has been present prior to receiving the RRC reconfiguration message described above" may be rephrased as or supplemented with "determining whether or not the establishment of the SDAP entity (in step S806) described above is as a result of a full configuration". "Based on that no SDAP entity corresponding to the PDU session described above has been present prior to receiving the RRC reconfiguration message described above" may be rephrased as or supplemented with "based on that the establishment of the SDAP entity (in step S806) described above is not as a result of a full configuration".

In step S808, "no SDAP entity corresponding to the PDU session described above has been present prior to receiving the RRC reconfiguration message described above" may be rephrased as other conditions (else) of "an SDAP entity corresponding to the PDU session described above has been present prior to receiving the RRC reconfiguration message described above". "The establishment of the SDAP entity (in step S806) described above is not as a result of a full configuration" may be rephrased as other conditions (else) of "the establishment of the SDAP entity (in step S806) described above is as a result of a full configuration".

Figure 9:
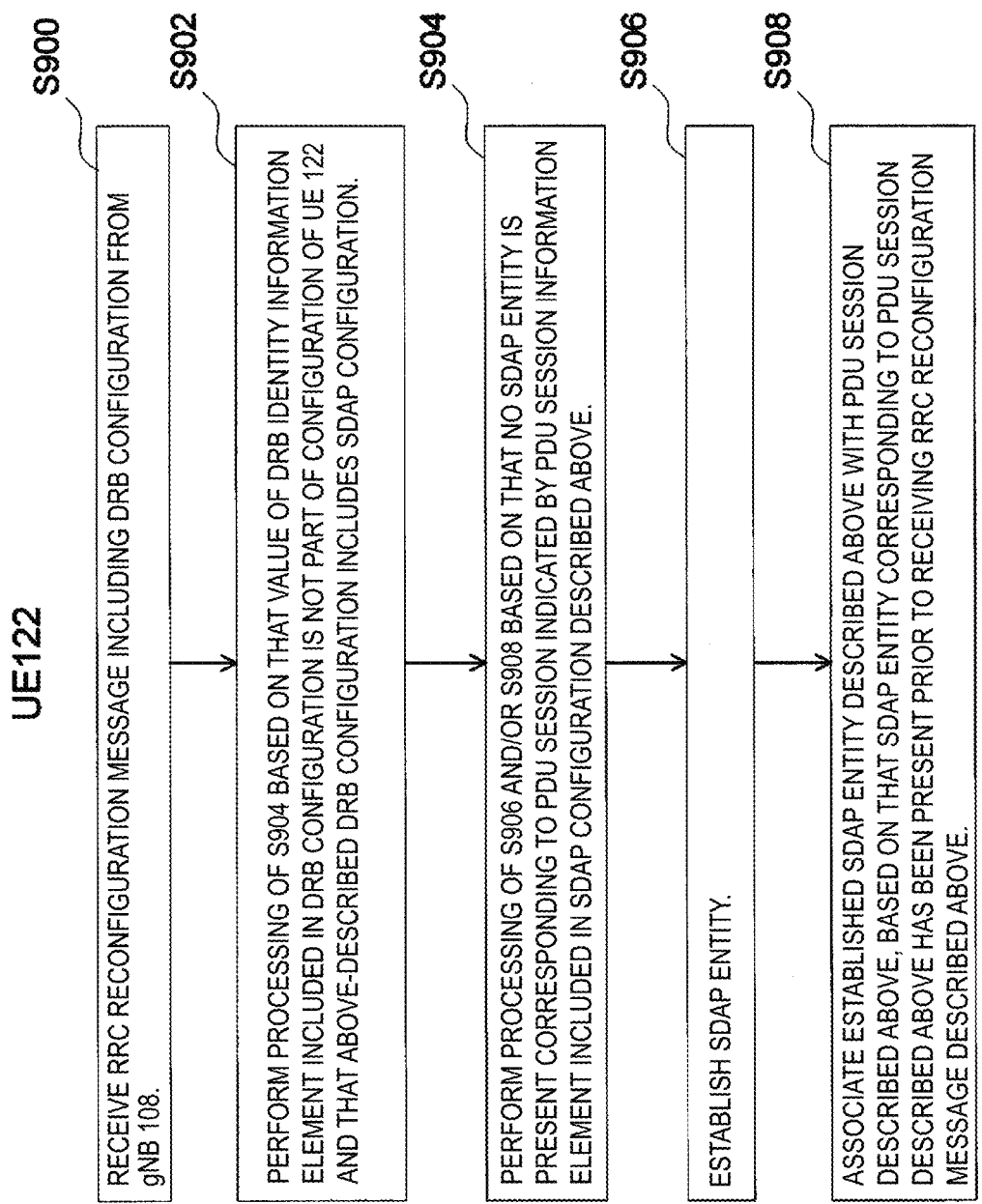
FIG. 9 is a diagram illustrating another example of a processing method according to an embodiment of the present invention.

Next, another example of a processing method of the UE 122 according to the embodiments of the present invention will be described with reference to FIG. 9.

The processing unit 602 of the gNB 108 generates an RRC reconfiguration message including the DRB configuration for causing the UE 122 to perform processing, and transmits the RRC reconfiguration message from the transmitter 600 to the UE 122 (not illustrated). The reception unit 500 of the UE 122 receives the RRC reconfiguration message from the gNB 108 (step S900). Note that the UE 122 may receive the RRC message including the DRB configuration described above from the eNB 102.

Next, the processing unit 502 of the UE 122 determines whether or not the value of the DRB identity information element included in the DRB configuration described above is configured to the UE 122 and whether or not the DRB configuration described above includes an SDAP configuration, and based on that the value of the DRB identity information element included in the DRB configuration described above is not part of a configuration of the UE 122 and/or the DRB configuration described above includes an SDAP configuration, performs processing of step S904 described below (step S902).

The processing unit 502 of the UE 122 determines whether or not an SDAP entity corresponding to a PDU session indicated by a PDU session information element included in the SDAP configuration described above is present, and based on that no SDAP entity is present corresponding to the PDU session indicated by the PDU session information element included in the SDAP configuration described above, performs processing of step S906 described below and/or step S908 described below (step S904).

The processing unit 502 of the UE 122 establishes an SDAP entity (step S806). Note that, prior to establishing the SDAP entity described above, a DRB corresponding to the value of the DRB identity information element described above may be established by establishing a PDCP entity or the like. Note that after establishing the SDAP entity described above, the SDAP entity may be further configured or reconfigured. In a case that the SDAP entity is configured or reconfigured, the established DRB described above may be related to the SDAP entity described above.

The processing unit 502 of the UE 122 determines whether or not an SDAP entity corresponding to the PDU session described above has been present prior to receiving the RRC reconfiguration message described above, and based on that the SDAP entity corresponding to the PDU session described above has been present prior to receiving the RRC reconfiguration message described above, associates the established SDAP entity (in step S906) described above to the PDU session described above (step S908).

"Determining whether or not an SDAP entity corresponding to the PDU session described above has been present prior to receiving the RRC reconfiguration message described above" may be rephrased as or supplemented with "determining whether or not the establishment of the SDAP entity (in step S906) described above is as a result of a full configuration". "Based on that an SDAP entity corresponding to the PDU session described above has been present prior to receiving the RRC reconfiguration message described above" may be rephrased as or supplemented with "based on that the establishment of the SDAP entity (in step S906) described above is as a result of a full configuration".

In step S908, "an SDAP entity corresponding to the PDU session described above has been present prior to receiving the RRC reconfiguration message described above" may be rephrased as other conditions (else) of "no SDAP entity corresponding to the PDU session described above has been present prior to receiving the RRC reconfiguration message described above". "The establishment of the SDAP entity (in step S906) described above is as a result of a full configuration" may be rephrased as other conditions (else) of "the establishment of the SDAP entity (in step S806) described above is not as a result of a full configuration".

Note that, in the embodiments of the present invention, processing for indicating to an upper layer that "user-plane resources for the PDU session corresponding to the PDU session information element described above are established or configured" may be performed by the RRC 308 or RRC 208, or may be performed by the SDAP 310. The upper layer to which a condition that "user-plane resources for the PDU session corresponding to the PDU session information element described above are established or configured" is indicated may be an NAS layer. The indicating to the upper layer that "user-plane resources for the PDU session corresponding to the PDU session information element described above are established or configured" may be performed after the RRC 308 or the RRC 208 confirms that a mapping rule between the QoS flow identity information element included in the QoS flow information element to be added, or the QoS flow corresponding to the value of the QoS flow identity information element and the radio bearer included in the DRB configuration described above is stored in the SDAP 310. The method for confirming that the mapping rule described above is stored may be an indication for indicating that the mapping rule is stored from the SDAP 310 to the RRC 308 or the RRC 208.

Thus, in the embodiments of the present invention, in a case that the SDAP entity is established, by indicating to the upper layer that user-plane resources for the PDU session have been established or configured in a case that a PDU entity is newly established, the establishment of the user-plane resources for the PDU sessions in the lower layer can be detected in the upper layer, and user data can be transmitted at an optimal timing. Thus, a terminal apparatus can efficiently perform communication by reducing complexity of protocol processing.

Note that the radio bearer configuration according to each embodiment of the present invention may be included not only in the RRC connection reconfiguration procedure but also in an RRC Establishment procedure or an RRC Re-Establishment procedure. The radio bearer in each embodiment of the present invention may be a DRB or an SRB.

Note that the "information element" in each embodiment of the present invention may be referred to as a "field".

In each embodiment of the present invention, the indicating to the upper layer that "user-plane resources for the PDU session corresponding to the PDU session information element are established" and/or "user-plane resources for the PDU session corresponding to the PDU session information element are established or configured" may be information other than the rephrase in each embodiment of the present invention as long as it is information indicating that "user-plane resources for the PDU session corresponding to the PDU session information element are established" and/or "user-plane resources for the PDU session corresponding to the PDU session information element described above are established or configured".

In each embodiment of the present invention, "the DRB configuration includes the SDAP configuration" may refer to that EN-DC is not used, i.e., the opposite of EN-DC being used. This is because the EPC is used as the core network only in the case of EN-DC in New Radio (NR) technology, as described in NPL 8 and NPL 9.

The processing and method of the terminal apparatus and the base station apparatus described in each embodiment of the present invention can be summarized as follows, for example.

Specifically, a terminal apparatus for communicating with a base station apparatus includes: a reception unit configured to receive an RRC reconfiguration message including a DRB configuration from the base station apparatus; and a processing unit configured to: establish an SDAP entity in a case that no SDAP entity is present for a PDU session information element included in an SDAP configuration, based on conditions that a value of a DRB identity information element included in the DRB configuration is not part of a configuration of the terminal apparatus, and that the SDAP configuration is included in the DRB configuration; further determine whether or not an SDAP entity for the PDU session information element has been present before the RRC reconfiguration message is received; indicate to an upper layer that user-plane resources have been configured for a PDU session corresponding to a value of the PDU session information element, based on a condition that no SDAP entity for the PDU session information element has been present before the RRC reconfiguration message is received; and associate the established SDAP entity with the PDU session based on that the SDAP entity for the PDU session information element has been present before the RRC reconfiguration message is received.

A base station apparatus for communicating with a terminal apparatus includes: a transmitter configured to transmit an RRC reconfiguration message including a DRB configuration to the terminal apparatus; and a processing unit configured to cause the terminal apparatus to perform processing by including the DRB configuration in the RRC reconfiguration message, wherein the processing includes: establishing an SDAP entity in a case that no SDAP entity is present for a PDU session information element included in an SDAP configuration, based on conditions that a value of a DRB identity information element included in the DRB configuration is not part of a configuration of the terminal apparatus, and that the SDAP configuration is included in the DRB configuration; further indicating to an upper layer that user-plane resources have been configured for a PDU session corresponding to a value of the PDU session information element, based on a condition that no SDAP entity for the PDU session information element has been present before the RRC reconfiguration message is received; and associating the established SDAP entity with the PDU session based on that the SDAP entity for the PDU session information element has been present before the RRC reconfiguration message is received.

A method for a terminal apparatus for communicating with a base station apparatus, the method including the steps of: receiving an RRC reconfiguration message including a DRB configuration from the base station apparatus; establishing an SDAP entity in a case that no SDAP entity is present for a PDU session information element included in an SDAP configuration, based on conditions that a value of a DRB identity information element included in the DRB configuration is not part of a configuration of the terminal apparatus, and that the SDAP configuration is included in the DRB configuration; further determining whether or not an SDAP entity for the PDU session information element has been present before the RRC reconfiguration message is received; indicating to an upper layer that user-plane resources have been configured for a PDU session corresponding to a value of the PDU session information element, based on a condition that no SDAP entity for the PDU session information element has been present before the RRC reconfiguration message is received; and associating the established SDAP entity with the PDU session based on a condition that the SDAP entity for the PDU session information element has been present before the RRC reconfiguration message is received.

A method for a base station apparatus for communicating with a terminal apparatus, the method including the steps of: transmitting an RRC reconfiguration message including a DRB configuration to the terminal apparatus; and causing the terminal apparatus to perform processing by including the DRB configuration in the RRC reconfiguration message, wherein the processing includes; establishing an SDAP entity in a case that no SDAP entity is present for a PDU session information element included in an SDAP configuration, based on conditions that a value of a DRB identity information element included in the DRB configuration is not part of a configuration of the terminal apparatus, and that the SDAP configuration is included in the DRB configuration; further determining whether or not the SDAP entity for the PDU session information element has been present before the RRC reconfiguration message is received; indicating to an upper layer that user-plane resources have been configured for a PDU session corresponding to a value of the PDU session information element, based on a condition that no SDAP entity for the PDU session information element has been present before the RRC reconfiguration message is received; and associating the established SDAP entity with the PDU session based on that the SDAP entity for the PDU session information element has been present before the RRC reconfiguration message is received.

A program operating on an apparatus according to the present invention may serve as a program that controls a Central Processing Unit (CPU) and the like to cause a computer to operate in such a manner as to realize the functions of the above-described embodiments according to the present invention. The program or information handled by the program is temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatus, and the computer system includes an operating system and hardware components such as a peripheral device. The "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. The above-described program may be configured to realize some of the functions described above, and additionally may be configured to realize the functions described above in combination with a program already recorded in the computer system.

Each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. In a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention.

A configuration in which components, which are described in the embodiment described above, having similar effects are interchanged is also included in the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

The invention claimed is:

1. A terminal apparatus for communicating with a base station apparatus, the terminal apparatus comprising:

reception circuitry configured to receive a Radio Resource Control (RRC) reconfiguration message including a Data Radio Bearer (DRB) configuration from the base station apparatus; and processing circuitry, wherein the processing circuitry, in processing the received RRC reconfiguration message, is configured to determine a) that a DRB identity included in the DRB configuration is not part of a current configuration of the terminal apparatus, determine b) the a Service Data Adaptation Protocol (SDAP) configuration is included in the DRB configuration, and determine c) that an SDAP entity corresponding to a Protocol Data Unit (PDU) session indicated by a PDU session information element included in the SDAP configuration does not exist, in a case that the processing circuitry determines a) that a DRB identity included in the DRB configuration is not part of the current configuration of the terminal apparatus, b) that the SDAP configuration is included in the DRB configuration, and c) that the SDAP entity corresponding to the PDU session indicated by the PDU session information element included in the SDAP configuration does not exist, establish an SDAP entity and further determine d) whether it is before receiving the RRC reconfiguration message or not that the SDAP entity corresponding to the PDU session indicated by the PDU session information element does not exist, in a case that the processing circuitry determines that the SDAP entity corresponding to the PDU session indicated by the PDU session information element does not exist, indicate establishment of a user-plane resource for the PDU session information element to an upper layer.

2. A communication method used by a terminal apparatus for communicating with a base station apparatus, the communication method comprising the steps of:

receiving a Radio Resource Control (RRC) reconfiguration message including a Data Radio Bearer (DRB) configuration from the base station apparatus;

in processing the received RRC reconfiguration message, determining a) that a DRB identity included in the DRB configuration is not part of a current configuration of the terminal apparatus, determining b) that a Service Data Adaptation Protocol (SDAP) configuration is included in the DRB configuration, and determining c) that an SDAP entity corresponding to a Protocol Data Unit (PDU) session indicated by a PDU session information element included in the SDAP configuration does not exist;

in a case of determining a) that a DRB identity included in the DRB configuration is not part of a current configuration of the terminal apparatus, b) that the SDAP configuration is included in the DRB configuration, and c) that the SDAP entity corresponding to the PDU session indicated by the PDU session information element included in the SDAP configuration does not exist, establishing an SDAP entity and further determining d) whether it is before receiving the RRC reconfiguration message or not that the SDAP entity corresponding to the PDU session indicated by the PDU session information element does not exist, in a case determining that the SDAP entity corresponding to the PDU session indicated by the PDU session information element does not exist, indicating establishment of a user-plane resource for the PDU session information element to an upper layer.

* * * * *